United States Patent
Spitz et al.

(10) Patent No.: US 9,697,504 B2
(45) Date of Patent: Jul. 4, 2017

(54) N-LEVEL REPLICATION OF SUPPLEMENTAL CONTENT

(71) Applicant: Cinsay, Inc., Dallas, TX (US)

(72) Inventors: Robert K. Spitz, Amherst, NH (US);
Todd Downing, Irving, TX (US);
Christian Briggs, Austin, TX (US)

(73) Assignee: Cinsay, Inc., Dallas, TX (US)

( * ) Notice: Subject to any disclaimer, the term of this patent is extended or adjusted under 35 U.S.C. 154(b) by 0 days.

(21) Appl. No.: 14/498,800

(22) Filed: Sep. 26, 2014

(65) Prior Publication Data

US 2015/0092111 A1    Apr. 2, 2015

Related U.S. Application Data

(60) Provisional application No. 61/883,883, filed on Sep. 27, 2013, provisional application No. 61/883,809, filed on Sep. 27, 2013.

(51) Int. Cl.
*G06Q 20/08* (2012.01)
*G06Q 30/02* (2012.01)

(52) U.S. Cl.
CPC ..... *G06Q 20/0855* (2013.01); *G06Q 30/0277* (2013.01)

(58) Field of Classification Search
CPC ........... G06Q 30/0601; G06Q 20/0855; G06Q 30/0277; H04N 21/4316; H04N 21/435; H04N 21/47815
See application file for complete search history.

(56) References Cited

U.S. PATENT DOCUMENTS

| | | | |
|---|---|---|---|
| 7,946,492 B2 | 5/2011 | Rohs | |
| 8,438,646 B2 | 5/2013 | Sidi | |
| 8,549,555 B2 | 10/2013 | Briggs et al. | |
| 8,645,217 B2 | 2/2014 | Siegel et al. | |
| 8,645,991 B2 | 2/2014 | Mcintire et al. | |
| 8,655,146 B2 | 2/2014 | Bennett et al. | |
| 8,708,223 B2 | 4/2014 | Gates et al. | |
| 8,769,584 B2 | 7/2014 | Neumeier et al. | |
| 2002/0083447 A1 | 6/2002 | Heron et al. | |
| 2002/0199181 A1 | 12/2002 | Allen | |
| 2003/0023490 A1* | 1/2003 | Lenyon et al. | 705/14 |
| 2004/0003406 A1* | 1/2004 | Billmaier | G06F 1/3203 725/60 |

(Continued)

FOREIGN PATENT DOCUMENTS

WO    WO 2013/192557 A2    12/2013

OTHER PUBLICATIONS

International Search Report dated Nov. 24, 2014 in connection with international Application No. PCT/US14/55233; 2 pages.

(Continued)

*Primary Examiner* — Nathan Flynn
*Assistant Examiner* — Alexander Q Huerta

(57) ABSTRACT

A method includes receiving a transacting media container having video content and an affiliate tracking identifier with first entity information associated with a first entity. The method also includes identifying second entity information associated with a second entity and retrieving supplemental content based on the second entity information. The method further includes adding the supplemental content to the transacting media container and the second entity information to the affiliate tracking identifier.

18 Claims, 9 Drawing Sheets

(56) References Cited

U.S. PATENT DOCUMENTS

| | | | |
|---|---|---|---|
| 2005/0033656 | A1 | 2/2005 | Wang et al. |
| 2007/0157228 | A1 | 7/2007 | Bayer et al. |
| 2007/0204308 | A1 | 8/2007 | Nicholas et al. |
| 2007/0250901 | A1 | 10/2007 | McIntire et al. |
| 2007/0266399 | A1 | 11/2007 | Sidi |
| 2007/0271149 | A1* | 11/2007 | Siegel ................ G06Q 30/0603 705/26.41 |
| 2007/0288518 | A1 | 12/2007 | Crigler et al. |
| 2007/0300280 | A1 | 12/2007 | Turner et al. |
| 2008/0148283 | A1* | 6/2008 | Allen et al. .................... 719/316 |
| 2008/0235085 | A1 | 9/2008 | Kovinsky et al. |
| 2009/0119169 | A1 | 5/2009 | Chandratillake et al. |
| 2009/0265255 | A1 | 10/2009 | Jackson et al. |
| 2009/0276805 | A1* | 11/2009 | Andrews, II ........... G06Q 30/02 725/35 |
| 2009/0327894 | A1* | 12/2009 | Rakib ..................... G11B 27/34 715/719 |
| 2010/0030578 | A1 | 2/2010 | Siddique et al. |
| 2010/0247061 | A1 | 9/2010 | Bennett et al. |
| 2010/0306805 | A1* | 12/2010 | Neumeier .......... H04N 5/44591 725/60 |
| 2011/0052144 | A1 | 3/2011 | Abbas et al. |
| 2011/0251897 | A1 | 10/2011 | Litvack et al. |
| 2012/0185355 | A1 | 7/2012 | Kilroy |
| 2012/0227060 | A1 | 9/2012 | Allen et al. |
| 2012/0227074 | A1 | 9/2012 | Hill et al. |
| 2012/0311662 | A1* | 12/2012 | Abnous ............. G06F 17/30607 726/1 |
| 2013/0014137 | A1 | 1/2013 | Bhatia et al. |
| 2013/0054757 | A1* | 2/2013 | Spitz .................. G06Q 30/0601 709/219 |
| 2013/0144903 | A1 | 6/2013 | Andrews, II et al. |
| 2013/0152123 | A1 | 6/2013 | Briggs et al. |
| 2013/0215116 | A1 | 8/2013 | Siddique et al. |
| 2013/0218964 | A1 | 8/2013 | Jakobson |
| 2013/0228615 | A1 | 9/2013 | Gates et al. |
| 2014/0164099 | A1* | 6/2014 | Schlesinger ....... G06Q 30/0277 705/14.43 |
| 2014/0254942 | A1 | 9/2014 | Liu et al. |
| 2014/0282700 | A1* | 9/2014 | Briggs ................. H04N 21/435 725/32 |
| 2015/0073919 | A1* | 3/2015 | Spitz ................ H04N 21/25866 705/14.66 |

OTHER PUBLICATIONS

Written Opinion of International Searching Authority dated Nov. 24, 2014 in connection with International Application No. PCT/US14/55233; 3 pages.

International Search Report dated Dec. 15, 2014 in connection with International Application No. PCT/US14/57595; 2 pages.

Written Opinion of International Searching Authority dated Dec. 15, 2014 in connection with International Application No. PCT/US14/57595; 3 pages.

International Search Report dated Dec. 16, 2014 in connection with International Application No. PCT/US14/55226; 2 pages.

Written Opinion of International Searching Authority dated Dec. 16, 2014 in connection with International Application No. PCT/US14/55226; 4 pages.

International Search Report dated Dec. 16, 2014 in connection with International Application No. PCT/US14/55229; 2 pages.

Written Opinion of International Searching Authority dated Dec. 16, 2014 in connection with International Application No. PCT/US14/55229; 4 pages.

Non-Final Office Action dated Dec. 18, 2014 in connection with U.S. Appl. No. 14/484,047; 8 pages.

Non-Final Office Action dated Dec. 19, 2014 in connection with U.S. Appl. No. 14/484,065; 8 pages.

Non-Final Office Action dated Dec. 26, 2014 in connection with U.S. Appl. No. 14/484,225; 8 pages.

Non-Final Office Action dated Jan. 6, 2015 in connection with U.S. Appl. No. 14/512,204; 18 pages.

Non-Final Office Action dated Jan. 9, 2015 in Connection with U.S. Appl. No. 14/292,423; 14 pages.

International Search Report dated Jan. 26, 2015 in connection with International Application No. PCT/US2014/060150; 2 pages.

Written Opinion of international Searching Authority dated Jan. 26, 2015 in connection with International Application No. PCT/US2014/060150; 4 pages.

Non-Final Office Action dated Feb. 24, 2015 in connection with U.S. Appl. No. 14/497,686; 13 pages.

Non-Final Office Action dated Mar. 3, 2015 in connection with U.S. Appl. No. 14/079,385; 13 pages.

* cited by examiner

N-LEVEL REPLICATION OF SUPPLEMENTAL CONTENT

CROSS-REFERENCE TO RELATED APPLICATIONS AND PRIORITY CLAIM

This disclosure claims priority under 35 U.S.C. §119(e) to the following patent applications:
U.S. Provisional Patent Application No. 61/883,883 filed on Sep. 27, 2013 and entitled "N-LEVEL REPLICATION OF SUPPLEMENTAL CONTENT FOR BASE CONTENT;" and
U.S. Provisional Patent Application No. 61/883,809 filed on Sep. 27, 2013 and entitled "AD-HOC DYNAMIC BINDING."
Both of these provisional patent applications are hereby incorporated by reference in their entirety.

TECHNICAL FIELD

This disclosure is directed in general to software and more specifically to multi-level (n-level) replication of supplemental content.

BACKGROUND

It is well-known that videos may be broadcast or provided through a number of media, such as television, the Internet, DVDs, and the like. To finance such video broadcasts, commercial advertisements are often placed in the videos. Commercials, however, require that a video be momentarily interrupted while the commercials are displayed. Not only is this annoying to viewers, but digital video recorders (DVRs) allow video programs to be pre-recorded. When the video programs are viewed, DVRs allow the viewers to fast-forward through commercials, thereby defeating the effectiveness and value of the commercials. When commercials are de-valued, costs are not adequately covered, and broadcast service quality suffers as a result. In many cases, costs are made up by charging viewers for video services.

In many conventional systems, a variety of different content has little or no interactivity. This includes both videos and images. For example, when viewing video, different objects in the video are often merely part of a single video stream that is inseparable with respect to the different objects. Static advertisements near the video stream related to the video are not very compelling as they are separated from the video in such a way that a user is not encouraged to interact with the static advertisement.

SUMMARY

This disclosure provides n-level replication of supplemental content.

In a first embodiment, a method includes receiving a transacting media container having video content and an affiliate tracking identifier with first entity information associated with a first entity. The method also includes identifying second entity information associated with a second entity and retrieving supplemental content based on the second entity information. The method further includes adding the supplemental content to the transacting media container and the second entity information to the affiliate tracking identifier.

In a second embodiment, an apparatus includes at least one memory configured to store a transacting media container, where the transacting media container includes video content and an affiliate tracking identifier with first entity information. The apparatus also includes at least one processing device configured to receive the transacting media container from a first entity, identify second entity information associated with a second entity, retrieve supplemental content based on the second entity information, and add the supplemental content to the transacting media container and the second entity information to the affiliate tracking identifier.

In a third embodiment, a non-transitory computer-readable medium includes logic stored on the computer-readable medium. The logic is configured when executed to cause at least one processing device to receive a transacting media container having video content and an affiliate tracking identifier with first entity information associated with a first entity, identify second entity information associated with a second entity, retrieve supplemental content based on the second entity information, and add the supplemental content to the transacting media container and the second entity information to the affiliate tracking identifier.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
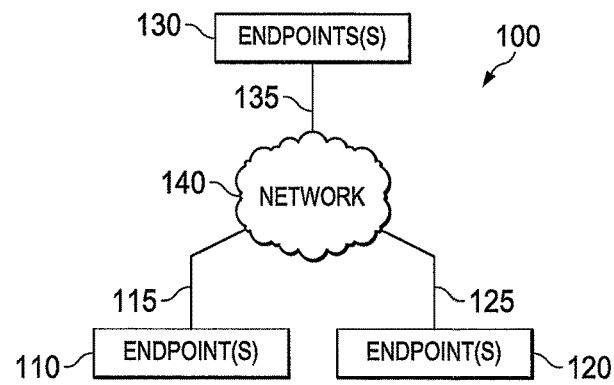
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint. Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s). Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from CINSAY, INC., which is briefly described below and is described more fully in U.S. Pat. No. 8,769,053 (which is hereby incorporated by reference in its entirety). This technology provides an innovative way for merchants to reach their customers online. In the traditional online sales model, merchants need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 5 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered.

Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CONTAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A merchant may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. The tracking identifiers may allow tracking, reporting, and commission calculations for a container or descendant branches of containers in the hierarchy, such as different entity levels. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants to connect with their consumers without disrupting the consumers' web activities. The end result is to connect the consumers directly with the merchants, eliminating the middleman and promoting a much more natural shopping experience.

The functionality of the above description may avail from any suitable components, such as those described in FIGS. 1 and 12 or other suitable components. The code itself may be written in any suitable format, including but not limited to Java, C++, C-sharp, HTML, HTML5, JAVA SCRIPT, PYTHON, RUBY, and the like.

There exists a variety of media content (video and audio) in the world that is independent, existing separate from any special containers such as the SMART CONTAINER code. Certain embodiments of this disclosure seek to harness the power of such content by dynamically binding supplemental content to the underlying base content. As a simple example, a video may be streamed from a content server, such as is provided by one of many video streaming services. According to certain embodiments of this disclosure, supplemental content is added dynamically to such content. In one or more embodiments, "dynamically" may also be referred to as "real-time." The disclosure below, among other things, describes the addition of such supplemental content and the determination of which supplemental content to provide. This can be done based on the base content, a user profile, a device profile, or other factors.

FIGS. 2A through 2E illustrate example dynamic bindings of supplemental content to base content according to this disclosure. As seen in FIGS. 2A through 2E, a base content 200 is generally shown. The base content 200 represents literally any type of visual or audio content—be it a picture, a streaming video, a live stream from a remote location, real-time content from the current location of a device, a web page, or other types of visual content. The supplemental content represents additional information related to the base content and/or a user accessing the base content. In one or more embodiments, the supplemental content can override the module playing the base content and expand the functionality of the module (such as with YOUTUBE).

In some embodiments, supplemental content may include additional information, configurable controls, selectable configurations, content transactional items such as products or services, and the like. Although the displayable area for the base content 200 is generally shown as having a rectangular boundary area, the displayable area for the base content 200 may take on other shapes. Additionally, the base content 200 may be shown in (or through) a virtually limitless number of devices, from mobile phones to computers to televisions.

As examples of the above, the base content 200 may be a video streamed through a video-based provider, such as YOUTUBE, VIMEO, NETFLIX, REDBOX INSTANT or others, being viewed on a computer, a mobile device, a television screen, or any other suitable device or devices. The base content 200 may also be a real-time view of content at a current location being viewed through an electronic device such as GOGGLE GLASS or a real-time view in a mobile computing device such as a tablet or phone. In yet other configurations, the base content 200 may be an image. In still other configurations, the base content 200 may be a web page.

Figure 2A:
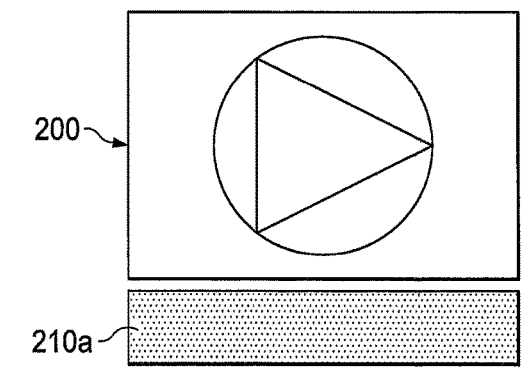
FIGS. 2A through 2E illustrate example dynamic bindings of supplemental content to base content according to this disclosure.
Figure 2B:
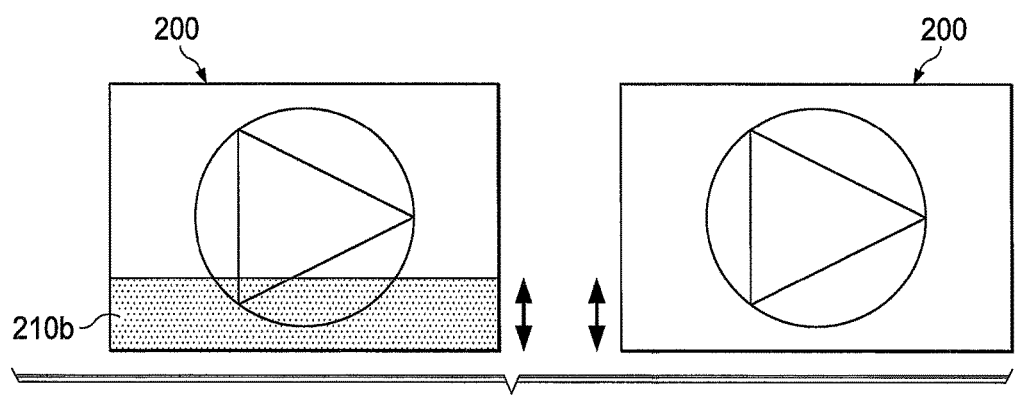
Figure 2C:
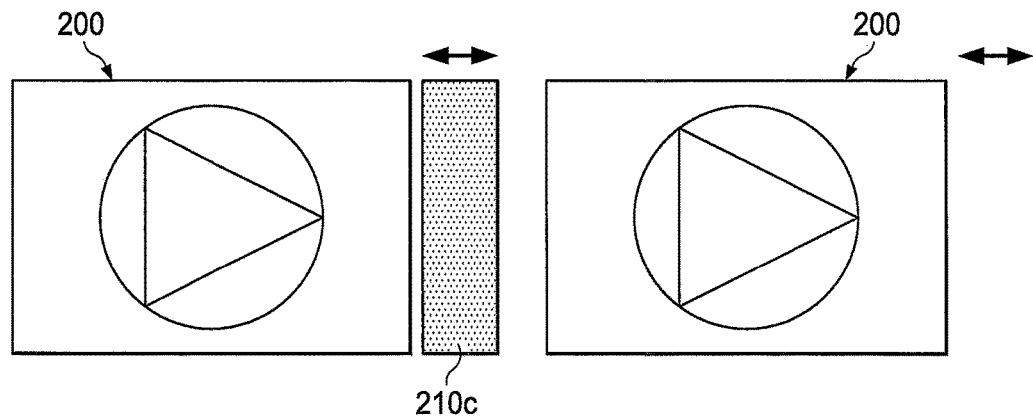

Also shown in FIGS. 2A through 2E are non-limiting examples of the supplemental content 210a-210e that are configured to dynamically bind to the base content 200. Although certain examples are provided, it should be understood that such examples are non-limiting and other configurations may be utilized as will become apparent to one of ordinary skill in the art having read this disclosure. In some configurations, the supplemental content may overlay the base content, whether partially transparent or not. Examples of supplemental content 210b and 210e overlaying the base content 200 are shown in FIG. 2B (left position) and FIG. 2E. In other configurations, the supplemental content may be positioned outside of the base content 200, such as to the left, right, top, bottom, or other positions. Examples of supplemental content 210a, 210c, and 210d outside of a boundary area of the base content 200 are shown in FIG. 2A, FIG. 2C (left position), and FIG. 2D.

In certain configurations, the supplemental content may be selectively displayable and/or selectively "hideable," such as due to user action or inaction. For example, in some configurations, a user interacting with a container for the base content may cause a menu with supplemental content to appear. Examples of these configurations are shown in FIGS. 2B and 2C with the double-edged arrows representing selective display-ability or selective hide-ability.

Figure 2D:
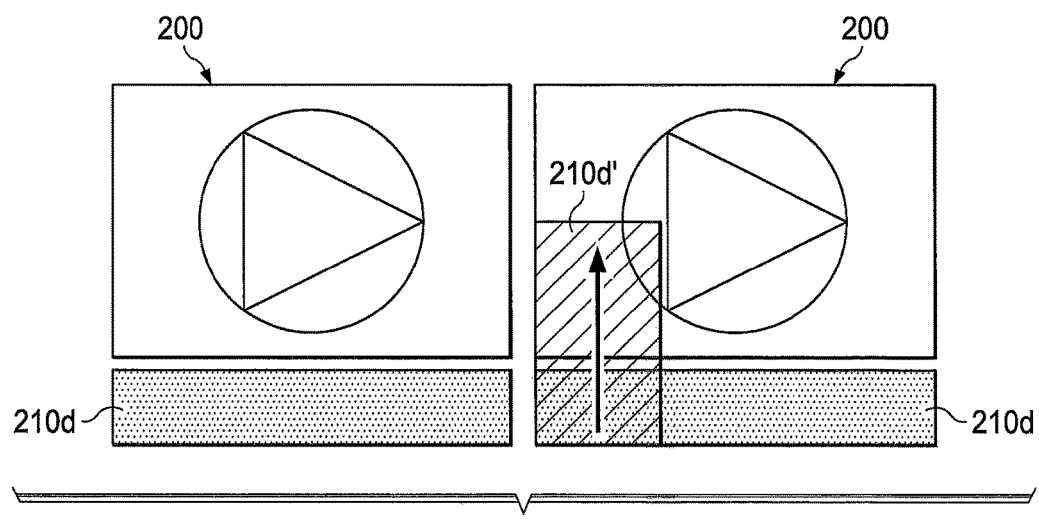
Figure 2E:
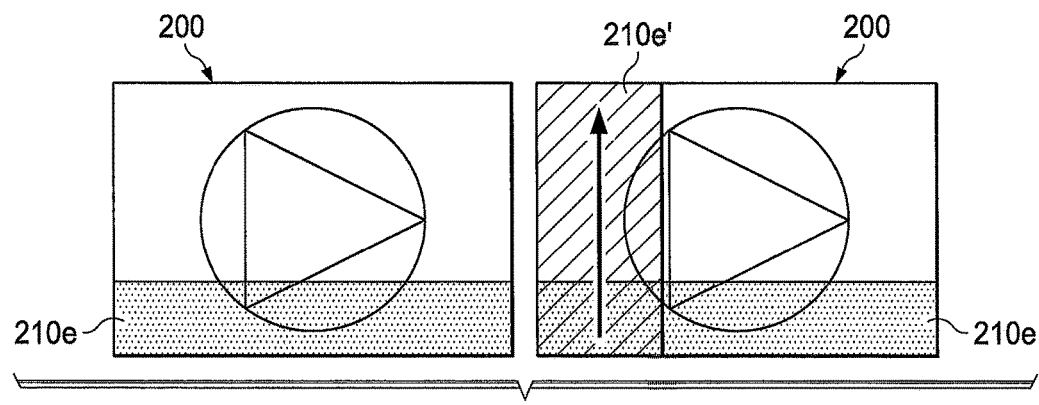

In still other configurations, the supplemental content may begin outside an area of the base content 200 and expand to cover, partially transparent or not, the base content 200. For example, as seen in FIG. 2D, the position of the supplemental content 210d on the left is just below a displayable area for the base content 200. However, in the position of the supplemental content 210d on the right (which may be the result of interactivity by a user), the supplemental content 210d expands to at least partially overlay the base content 200 (as shown by an area 210d'). A similar configuration is also shown in FIG. 2E except that the supplemental content 210e began as an overlay of the screen and an area 210e' covers an entire edge of the displayable area for the base content 200.

In particular configurations, the supplemental content is independent of the base content and is bound dynamically as the base content is displayed. For example, in particular settings, a web page may have a container (such as an embed code) that instantiates (loads or invokes) (i) the base content and (ii) the supplemental content. According to certain configurations, a call for supplemental content can be based on what is being shown in the base content, with the supplemental content specifically relating to the base content. Additionally, the supplemental content may be based on other parameters, such as a user profile or a geolocation of the user viewing the base content. As another example, in other configurations, a page analyzer can review a web page to determine locations where base content is contained and overlay or adjust such base content.

According to this specification, the concept of "binding" refers to associating supplemental content with base content, whereas "dynamic binding" refers to associating content on the fly, such as upon detection of the base content. In particular configurations, the initial association may allow the subsequent sharing of both the supplemental content and the base content together, as will be described with reference to figures below. More particularly, in certain configurations, an initial dynamic binding yields a shareable container (which may or may not be instantiated by an embed code) that, upon being shared to a new device, instantiates the underlying base content and the supplemental content. In other configurations, no such container is created, and a dynamic binding or dynamic association of the supplemental content is done for every playing of the video. In yet other configurations, supplemental content may be bound to a video, and the particular content is dynamically determined when the video is requested for playback.

A variety of technologies may be used for the above-described dynamic binding. As an example non-limiting configuration, the supplemental content may be configured as one layer in a display, where the base content is another layer. In such configurations, the layer for the supplemental content may be forward in the layers to allow an overlay as might be appropriate. In other configurations, the supplemental content may simply be provided a positioning with respect to the base content.

In particular configurations, the supplemental content can be dynamically sized based on a determined size of the base content and/or the spacing configurations for the device on which the base content and the supplemental content will be displayed. In other configurations, given a particular size for the base content, the supplemental content may use the same size for a container that requests a slightly reduced-size base content with extra room for the supplemental content. In implementing such a configuration, the technology can intercept a request for the base content and redirect such a request in order to request a container that, in turn, requests the base content and then the supplemental content. This latter configuration may be beneficial for scenarios where the supplemental content does not overlay the base content.

Figure 3A:
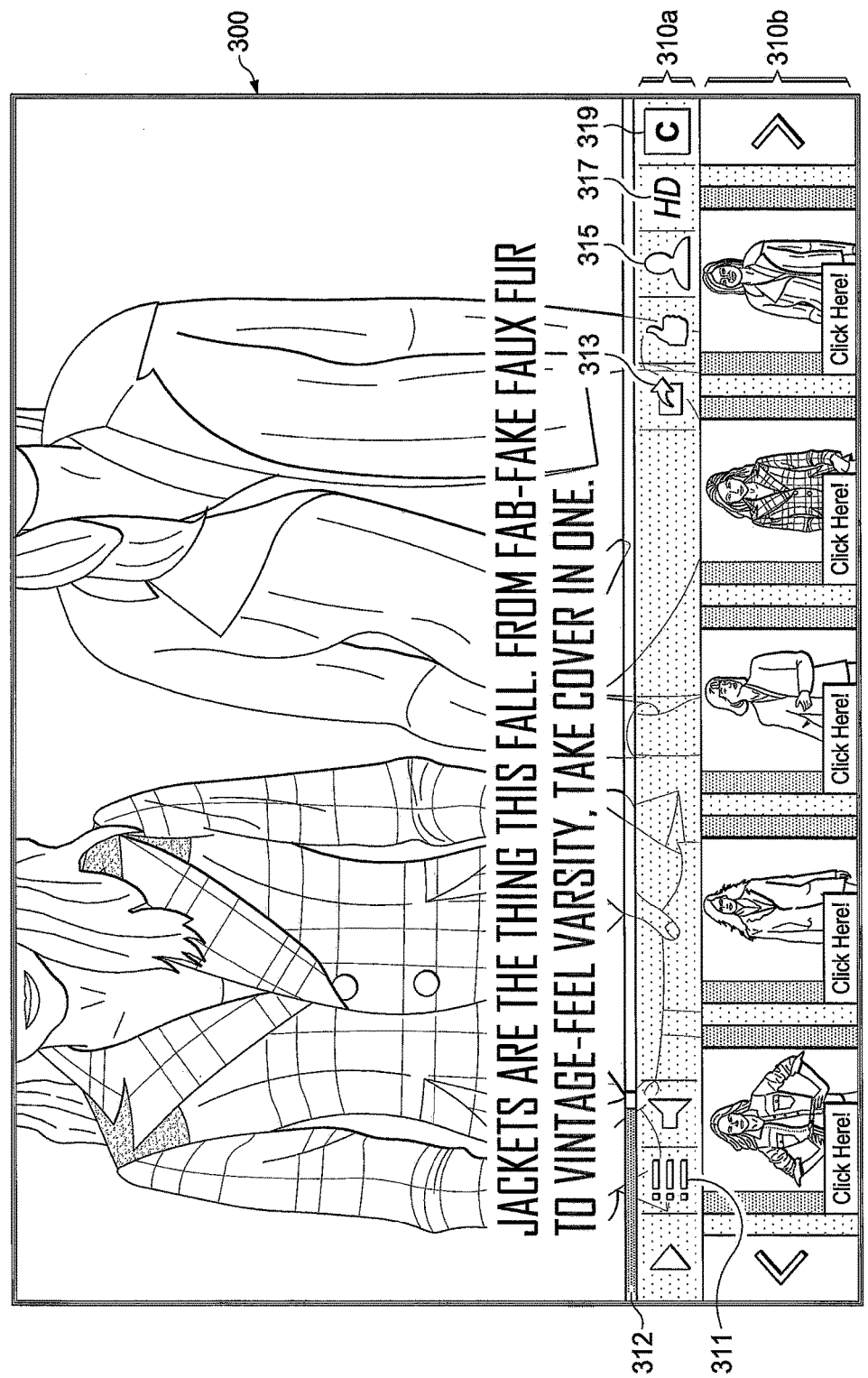
FIGS. 3A through 3C illustrate example displays that may be created with dynamic binding according to this disclosure.
Figure 3B:
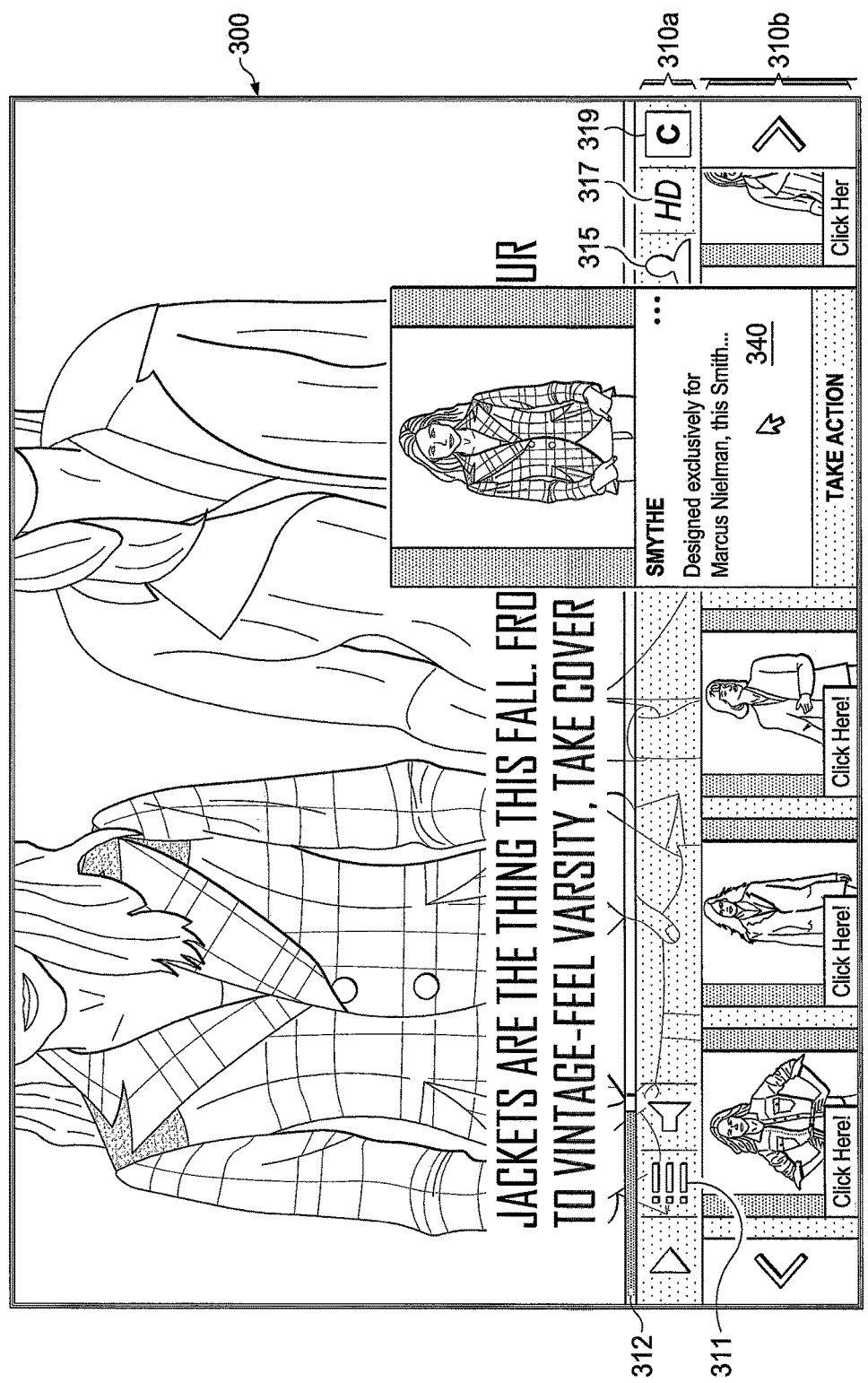
Figure 3C:
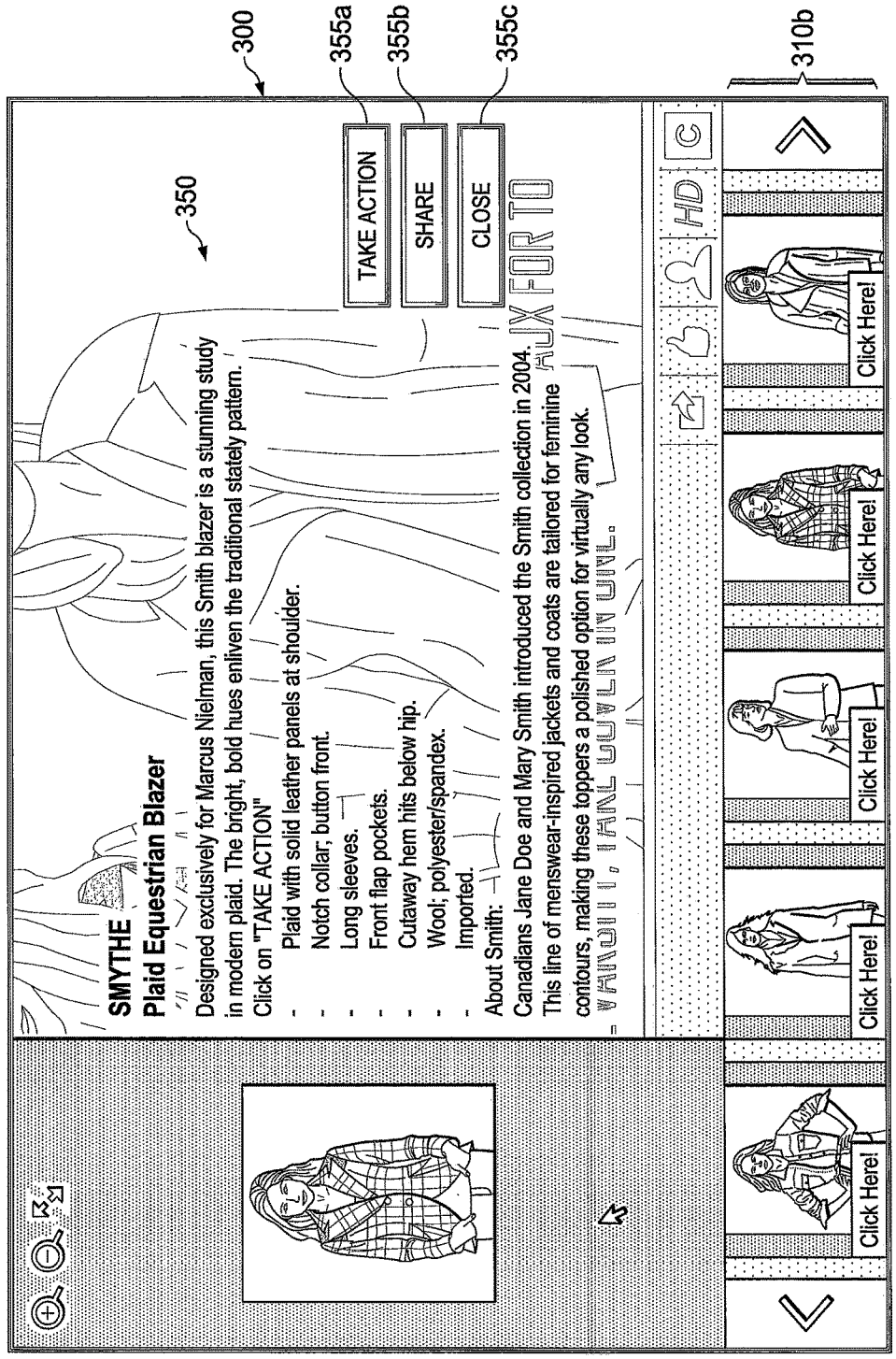

FIGS. 3A through 3C illustrate example displays that may be created with dynamic binding according to this disclosure. With reference to FIG. 3A, a base content 300 is shown. Here, the base content 300 is a video, although as noted above other types of content may also be used for the base content 300. Two types of supplemental content are shown, namely supplemental content 310a that initially overlays the displayable area of the base content 300 and supplemental content 310b that initially does not overlay the displayable area of the based content 300.

The supplemental content 310a is an interactive toolbar that contains a variety of options, including play and audio options 311, share options 313, account login options 315, video quality options 317, and further information options 319. The functionality of the play and audio options 311 are apparent to one of ordinary skill in the art. Also shown is a play bar 312, which is apparent to one of ordinary skill in the art. In particular configurations, the play bar 312 may replace a play bar that would otherwise co-exist for a display of the base content 300.

Upon clicking on the share options 313, a variety of other options may be provided. For example, a user may be given the opportunity to share a container of the dynamically bound content via networks such as FACEBOOK, MYSPACE, TWITTER, YAHOO, LINKEDIN, GOOGLE, or WORDPRESS. Furthermore, the user may be given the option to copy embed codes and share via email. Additionally, the user may be able to propagate the container by clicking the "like" thumb or "+1"ing on GOOGLE PLUS. The account login options 315 may allow a user to sign into a variety of networks including, for example, CINSAY, FACEBOOK, or GOOGLE. The video quality options 317 allow modification of the video, and the further information options 319 provide any of a variety of options that may be selected related to supplemental information.

The supplemental content 310b is shown as a product carousel that contains a plurality of interactive items corresponding to products or services shown in the video. In particular configurations, a user may interact with the displayable product carousel and purchase items or transact without leaving the displayable areas of the supplemental content 310b and base content 300. For example, with reference to a container (with the supplemental content and the base content 300) on a FACEBOOK wall of a friend, a user may purchase the product directly from the container for such items. In other configurations, a user may leave the container and be redirected to a website.

With reference to FIG. 3B, interactivity with a particular item 340 is shown, namely a product called SMYTHE. When a user "mouse overs" an item, eye tracking identifies a pause of the user's eyes over the item, a mouse hovers over the item, or the user "mouse clicks" on the item, it overlays as shown in FIG. 3B. In another example, a user could touch a touch screen to select an item. Further information about the product or service is shown. Additionally, when one clicks on the "TAKE ACTION" button, the user is taken to the view shown in FIG. 3C.

With reference to FIG. 3C, a user is allowed to further interact with the overlay screen, including viewing even further additional information 350. In FIG. 3C, in some embodiments, the base content 300 may be completely overlaid. In other examples, the base content 300 may be partially overlaid. In some embodiments, according to certain configurations, the user is allowed to further interact with the overlay screen by purchasing the item displayed, sharing the item displayed, and/or closing the additional information and reverting to the screen shown in FIG. 3A or 3B. In an example embodiment, the user may access these functions by clicking a "TAKE ACTION" button 355a, a "SHARE" button 355b, and/or a "CLOSE" button 355c.

Figure 4:
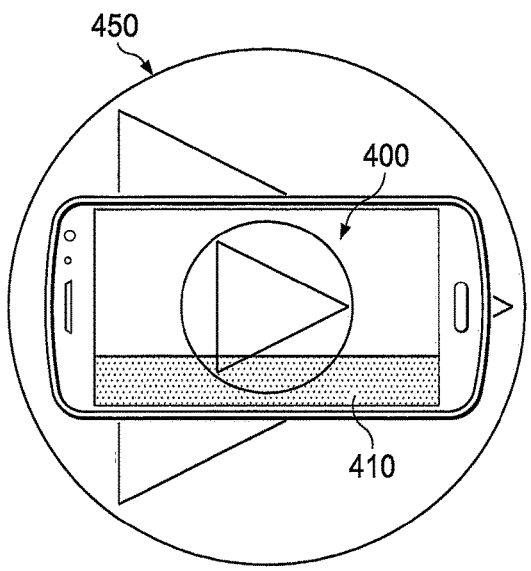
FIG. 4 illustrates another example display that may be created with dynamic binding according to this disclosure.

FIG. 4 illustrates another example display that may be created with dynamic binding according to this disclosure. In FIG. 4, a mobile phone 450 is positioned in front of an object. The object is displayed on the mobile phone 450, for example, as captured through a camera on the mobile phone. In an example embodiment, the mobile phone may be a smart phone with a display screen to display the object. The display shown on the display screen corresponds to underlying base content 400. Upon initiation of embodiments of this disclosure, supplemental content 410 can be provided on the display of the mobile phone 450.

Figure 5A:
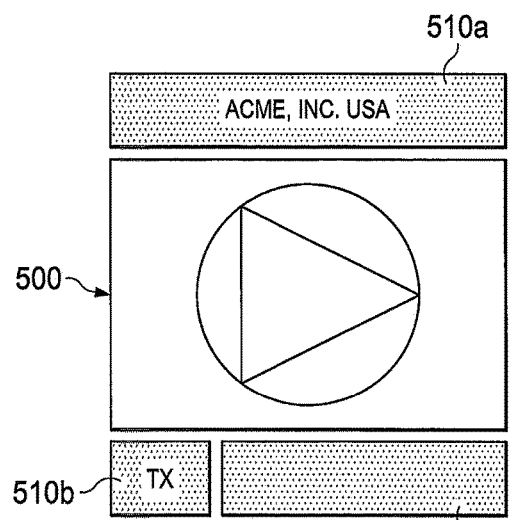
FIGS. 5A and 5B illustrate examples of n-level replication of supplemental content according to this disclosure.
Figure 5B:
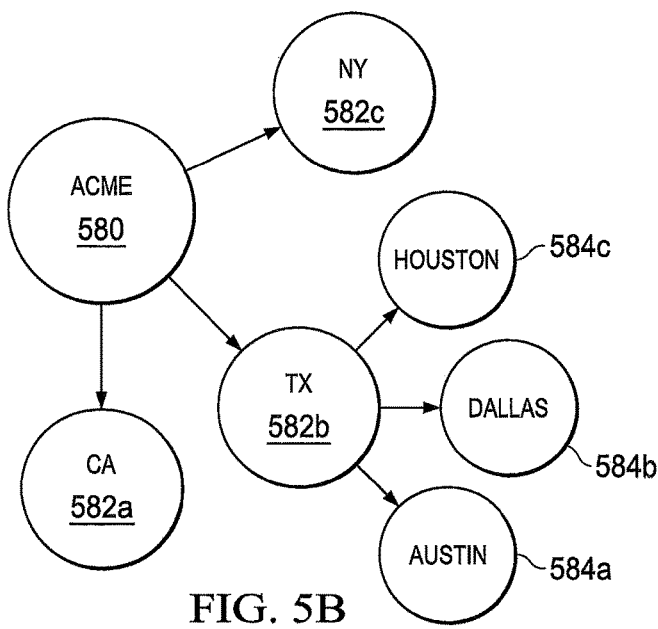

In the above description, the binding of supplemental content to base content has been described. As described below, to facilitate the placement of supplemental content with base content, the relationship between the two can be replicated to multiple levels (referred to as "n-levels," where n is an integer greater than one) of a hierarchy. In particular configurations, this replication may be viewed as a replication of a template, portions of which may or may not be modified according to the settings for the replication. Such a dynamic replication can help to yield significant time efficiency since an entity is not starting from scratch each time a new set of supplemental content is arranged. The entity may refer to a merchant or creator of smart stores FIGS. 5A and 5B illustrate examples of n-level replication of supplemental content according to this disclosure. In FIGS. 5A and 5B, the "levels" will be described with reference to geographic regions. However, it should be expressly understood that a variety of other levels may be utilized including, but not limited to, multi-level marketing scenarios.

With reference to FIG. 5A, base content 500 is provided along with supplemental content 510a-510c. Supplemental content 510a may correspond to any type of supplemental content. For example, supplemental content 510a could correspond to an entity, company, or organization. In this example, supplemental content 510a corresponds to a title or a logo of a particular company (namely "ACME, Inc."), which may have a national presence. Supplemental content 510b corresponds to other supplemental content. Supplemental content 510b could be related or unrelated to supplemental content 510a. In this example, supplemental content 510b corresponds to regional information (namely "Texas") and may include text, logos, and the like. Supplemental content 510c represents other supplemental content that may also be displayed, such as supplemental content related to one or more products or services. As a particular example, the supplemental content 510c could relate to one or more products or services or other content displayed in the base content 500.

With reference to FIG. 5B, a diagram is shown with an example replication arrangement. This diagram is a non-limiting example of one way to view the relationships between levels. The highest level 580 shown in FIG. 5B is associated with a particular company (ACME, Inc.) and could relate to a larger geographic region, such as national branding information. The next level 582 (referred to as the "second level") shows three example items 582a-582c related to smaller geographic regions, namely California, Texas, and New York in this example. The next level 584 (referred to as the "third level") shows three example items 584a-584c related to even smaller geographic regions, namely the cities of Austin, Dallas, and Houston in this example.

In operation, the company (ACME, Inc.) may choose to have a particular display of supplemental content replicated to all levels below it. For example, with reference to FIGS. 5A and 5B, all items in the chain will display the supplemental content 510a that the company chooses. This supplemental content 510a may be dynamically obtained and/or dynamically modifiable. In other embodiments, the supplemental content 510a can be set for each level. Additionally, the placement of the supplemental content 510a may also be dynamically obtained and/or dynamically modifiable.

Additionally, a region (such as in Texas) may choose to have all levels below it display supplemental content 510b. This supplemental content 510b may similarly be dynamically obtained and/or dynamically modifiable. Moreover, the placement of such supplemental content 510b may also be dynamically obtained and/or dynamically modifiable. This process of replication may continue downstream for any number of levels that have been configured.

The end result is that the identification of supplemental content at one level is effectively "replicated" to any lower levels. Each level can also select its own supplemental content, which can be displayed along with the supplemental content replicated from the higher levels.

In some embodiments, this replication may be viewed as "locking" parameters for downstream levels. Stated differently, "child" downstream levels inherit certain parameters from whatever "parent" upstream levels exist above it. The locked parameters may relate to a wide variety of characteristics. Example locked parameters could relate to arrangements of content (such as when regional logos are contained in the bottom left) or instructions on where to obtain certain content (such as a locked pointer to content). When a parent level dynamically modifies its locked parameters, those parameters propagate downstream to "child" levels in its chain when content is requested.

Note that the manner in which supplemental content is identified at any given level can vary depending on the implementation. For example, in some particular configurations, supplemental content related to an item may first be determined for the level itself, followed by a determination of upstream parameters that relate to additional supplemental content for such an item. In other particular configurations, a specific geographic area can be identified, followed by a determination of which supplemental content should be obtained for such a geographic region.

Again, note that while the levels are described here using geographic regions, the levels may also or alternatively take on other configurations. Additionally, although the chain in FIG. 5B is shown as a simple single n-level cluster, supplemental content may come from more than one n-level. For example, it may be determined that a viewer of base content 500 is a male between the ages of 21-24 in the northeastern United States during winter. Accordingly, among many items that are displayed in the base content 500, supplemental content for a winter cap suitable for a male during cold times of the year may be shown in conjunction with supplemental content for male gloves. Different supplemental content items may correspond to different chains, and different chains can have different levels with different supplemental content replication from parent to child levels. To the extent a conflict arises in terms of what supplemental content should be displayed and where, any suitable conflict procedures may be utilized to ensure that the simultaneous (or other) display of the supplemental content is correct.

In some embodiments, items of base content or supplemental content may be provided to a display based on categories having varying levels as described above. Categories may include:

"universal" or "global" relevance items of base content or supplemental content to be displayed at one or more endpoints (or on one or more displays associated with one or more endpoints);

"regional" relevance items of base content or supplemental content identified by the region where one or more endpoints or one or more displays of one or more endpoints are located at or near;

"local" relevance items of base content or supplemental content identified by the specific location where one or more endpoints or one or more displays of one or more endpoints are located at or near; or "individual" relevance items of base content or supplemental content identified by each individual endpoint or one or more displays of an individual endpoint.

As other examples, in some configurations, categories may include:

the time of day that one or more displays of one or more endpoints are displaying items of base content or supplemental content;

the time of year that one or more displays of one or more endpoints are displaying items of base content or supplemental content;

the types of cookies or cache stored in a memory associated with one or more endpoints or one or more displays of one or more endpoints;

the quantity of one or more specific types of cookies or cache stored in a memory associated with one or more endpoints or one or more displays of one or more endpoints;

one or more previous views of specific items of base content or supplemental content previously displayed on one or more displays of one or more endpoints;

one or more previous mouse clicks on specific items of base content or supplemental content previously displayed on one or more displays of one or more endpoints;

one or more previous purchases of goods or services previously displayed in one or more items of base content or supplemental content at one or more endpoints or on one or more displays of one or more endpoints;

the amount of time that has passed from the last purchase of a particular good or service previously displayed in one or more items of base content or supplemental content at one or more endpoints or on one or more displays of one or more endpoints; or items of base content or supplemental content that have been determined to be of interest to one or more users associated with an endpoint or a display of an endpoint based on previous views, previous mouse clicks, or previous purchases of goods or services previously displayed in one or more items of base content or supplemental content at one or more endpoints or on one or more displays of one or more endpoints.

As still other examples, in some configurations, categories may include:

one or more goods or services previously purchased through a specific merchant;

the types of goods or services previous purchased through one or more merchants;

the amount of time that has passed from the last purchase of a particular good or service through one or more merchants; or items of base content or supplemental content that have been determined to be of interest to one or more users associated with an endpoint or a display of an endpoint based on previous purchases of goods or services through one or more merchants.

Note that any combination of the above categories or other/additional categories could be used in any particular implementation of this approach. In general, the replication approach described here could be used with any suitable base content and any suitable supplemental content selected in any suitable manner.

One or more items of base content or supplemental content, such as item 340 depicted in FIG. 3B, may be categorized into the one or more categories. The item can then be associated with a transacting media container based on the one or more categories in order to provide a customized display, such as a display created with dynamic binding, to individual users or viewers. A transacting media container is a form of logical software container which functions as an auto customizing interactive media object with transactional capabilities. Note that a display may include items of base content or supplemental content provided by one container or by multiple containers. For example, as depicted in FIG. 3A, base content 300 may be provided from a first container, while supplemental content 310a or 310b may be provided from a second container or a third container. In general, all items of base content or supplemental content may be provided from the same container, all items of base content or supplemental content may be provided from different containers, or some items of base content or supplemental content may be provided from a common container while other items are provided from at least one other container.

Similar to one or more embodiments disclosed here, items of base content or supplemental content may be associated with a transacting media container associated with one or more categories. An endpoint or a display of an endpoint may be provided items of base content or supplemental content from particular containers based on an association between the endpoint or the display of the endpoint and one or more categories.

Figure 6:
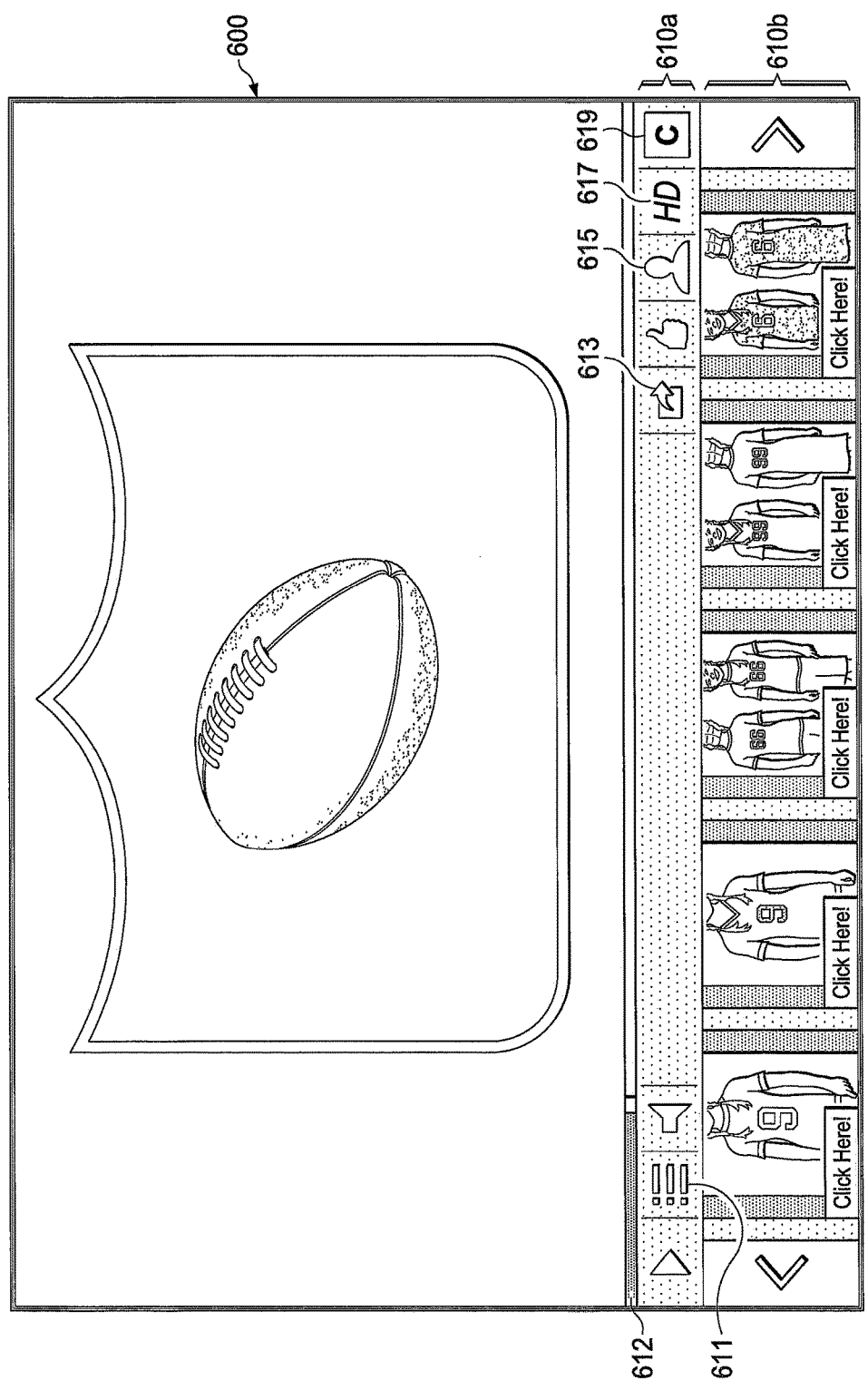
FIG. 6 illustrates an example display that may be created with n-level replication of supplemental content according to this disclosure.

FIG. 6 illustrates an example display 600 that may be created with n-level replication of supplemental content according to this disclosure. With reference to FIG. 6, base content 600 is shown, which in this example represents a video (such as a paused or playing video). Note, however, that other types of content (such as photographs or other still images) may also be used for the base content. The base content 600 may be associated with a transacting media container, which is itself associated with a category of universal or global relevance. In this particular example, the NATIONAL FOOTBALL LEAGUE (NFL) may be marketing jerseys of popular football players via the display created with dynamic binding. Because the base content 600 is associated with a transacting media container that is itself associated with a category of universal or global relevance, regardless of any other categories that an end user may be associated or identify with, the base content 600 depicting the NFL logo may always appear whenever a user interacts with the NFL display created with dynamic binding.

As a particular example, assume a first user at an endpoint in San Francisco interacts with the NFL display created with dynamic binding, and a second user at an endpoint in Miami interacts with the NFL display created with dynamic binding at the same time or at a different time. Both users can see the same base content 600 (such as the NH, logo) in the same location of their respective displays. Thus, because the base content 600 is associated with a transacting media container associated with the category of universal or global relevance, every NFL display can show the same base content, regardless of any associations an endpoint or a display at an endpoint may have with any category.

The supplemental content provided to different endpoints, however, can vary based on one or more associations an endpoint or a display at an endpoint may have with any category. In FIG. 6, supplemental content 610a is an interactive toolbar that contains a variety of options, including play and audio options 611, share options 613, account login options 615, video quality options 617, and further information options 619. The functionality of the play and audio options 611 are apparent to one of ordinary skill in the art. The functionality of the play and audio options 611 are apparent to one of ordinary skill in the art. Also shown is a play bar 612, which is apparent to one of ordinary skill in the art. In particular configurations, the play bar 612 may replace a play bar that would otherwise co-exist for a display of the base content 600.

The supplemental content 610a may itself be associated with a transacting media container associated with a category of universal or global relevance. In some embodiments, for example, the supplemental content 610a may be associated with the same transacting media container as the base content 600. However, in other embodiments, the supplemental content 610a may be associated with a different transacting media container associated with the category of universal or global relevance. As a particular example, the NFL may wish for all users at all endpoints or all displays of endpoints to have access to the supplemental content 610a regardless of any categories with which the individual endpoints or individual displays of endpoints may be associated. Thus, for instance, users may use the supplemental content 510a to control video-streaming of the base content 600.

Supplemental content 610b is shown as a product carousel that contains a plurality of interactive items that correspond to products or services that may be shown in or associated with the video. A user may interact with the displayable product carousel and purchase items or transact without leaving the displayable areas of the supplemental content 610a and the base content 600. Furthermore, the supplemental content 610b may be associated with a transacting media container associated with a regional relevance. In FIG. 6, for instance, each displayable product in the carousel of the supplemental content 610b could represent a DALLAS COWBOYS jersey or T-shirt. The endpoint or a display of the endpoint may be located in the Dallas/Ft. Worth metroplex, allowing a user to view DALLAS COWBOYS jerseys and T-shirts as the supplemental content 610b. Conversely, an endpoint or a display of an endpoint located in Chicago instead may view CHICAGO BEARS jerseys and T-shirts as the supplemental content 610b. By storing supplemental content 610b in a container associated with regional relevance, local entities (such as the DALLAS COWBOYS or CHICAGO BEARS) instead of global or national entities (such as the NFL) may be able to provide or market more focused products or services via the supplemental content 610b to their respective markets.

It should be understood that while the base content 600 and the supplemental content 610a described above may be associated with a single transacting media container associated with universal or global relevance, the base content 600 or the supplemental content 610a may be associated with other transacting media containers associated with other categories. For example, the base content 600 or the supplemental content 610a could be limited to selected endpoints or displays of endpoints based on associations with regional or local categories. Furthermore, the supplemental content 610b may be associated with a transacting media container associated with universal or global relevance so that, regardless of associations between endpoints or display of endpoints and categories, all users at endpoints may view same content as the supplemental content 610b. For example, if the DALLAS COWBOYS win another SUPER BOWL, after doing so the NFL may re-categorize the supplemental content 610b to a container associated with universal or global relevance and display DALLAS COWBOYS jerseys and T-shirts globally to generate additional sales with jerseys and T-shirts of the most recent SUPER BOWL winner. Additionally, note that while the previous examples illustrate two geographic levels of display (a global level and a regional level), the base content 600 and the supplemental content 610a or 610b may be associated with one or more transacting media containers associated with any number of geographic levels (such as global relevance, continental relevance, national relevance, regional relevance, state/provincial relevance, county relevance, city relevance, neighborhood relevance, climate relevance, or the like). To that extent, any category may be parsed or differentiated into multiple degrees and organized by container accordingly.

As another example, assume that supplemental content 610b can be associated with a transacting media container associated with a regional relevance and a particular gender. Similar to one or more embodiments disclosed here, a particular endpoint or a particular display of an endpoint may be located in a particular region or area, such as in the Dallas/Ft. Worth area. Additionally, the particular endpoint or display of an endpoint may store cache or cookies in a memory. The cache or cookies may be detected, and the types of cache or cookies detected may indicate that the user of the particular endpoint or display of an endpoint is of a particular gender (such as female). In FIG. 6, each displayable product in the carousel of the supplemental content 610b is a women's DALLAS COWBOYS jersey or T-shirt. Because the particular endpoint or the display of an endpoint may be located in the Dallas/Ft. Worth area and may store cache or cookies in an associated memory indicating that the user of the particular endpoint or display of an endpoint is female, the supplemental content 610b may allow a user of the particular endpoint or the display of an endpoint to view women's DALLAS COWBOYS jerseys and T-shirts in the supplemental content 610b without requiring an explicit identification of the user's gender.

It should be understood that while cache or cookies stored in a memory associated with an endpoint or a display of endpoint may be a category used to provide more focused content to an endpoint or a display of an endpoint, a wide variety of other or additional categories could be used. For example, as described above, time of day, time of year, previous views, mouse clicks, purchases or the like may be categories used to provide more focused content to endpoints or displays of endpoints associated with unique individual users or viewers. As a particular example, a user may have purchased a woman's TEXAS RANGERS jersey via an endpoint or a display of an endpoint at a previous time, such as through a dynamic binding display depicting TEXAS RANGERS content. Thus, when a user at that endpoint or a user at a display of that endpoint interacts with a dynamic binding display depicting NFL content as shown in FIG. 6, the dynamic binding display may provide women's DALLAS COWBOYS jerseys and T-shirts in the supplemental content 610b based on detecting or identifying a previous purchase of a women's TEXAS RANGERS jersey using a dynamic binding display depicting TEXAS RANGERS content.

Figure 7:
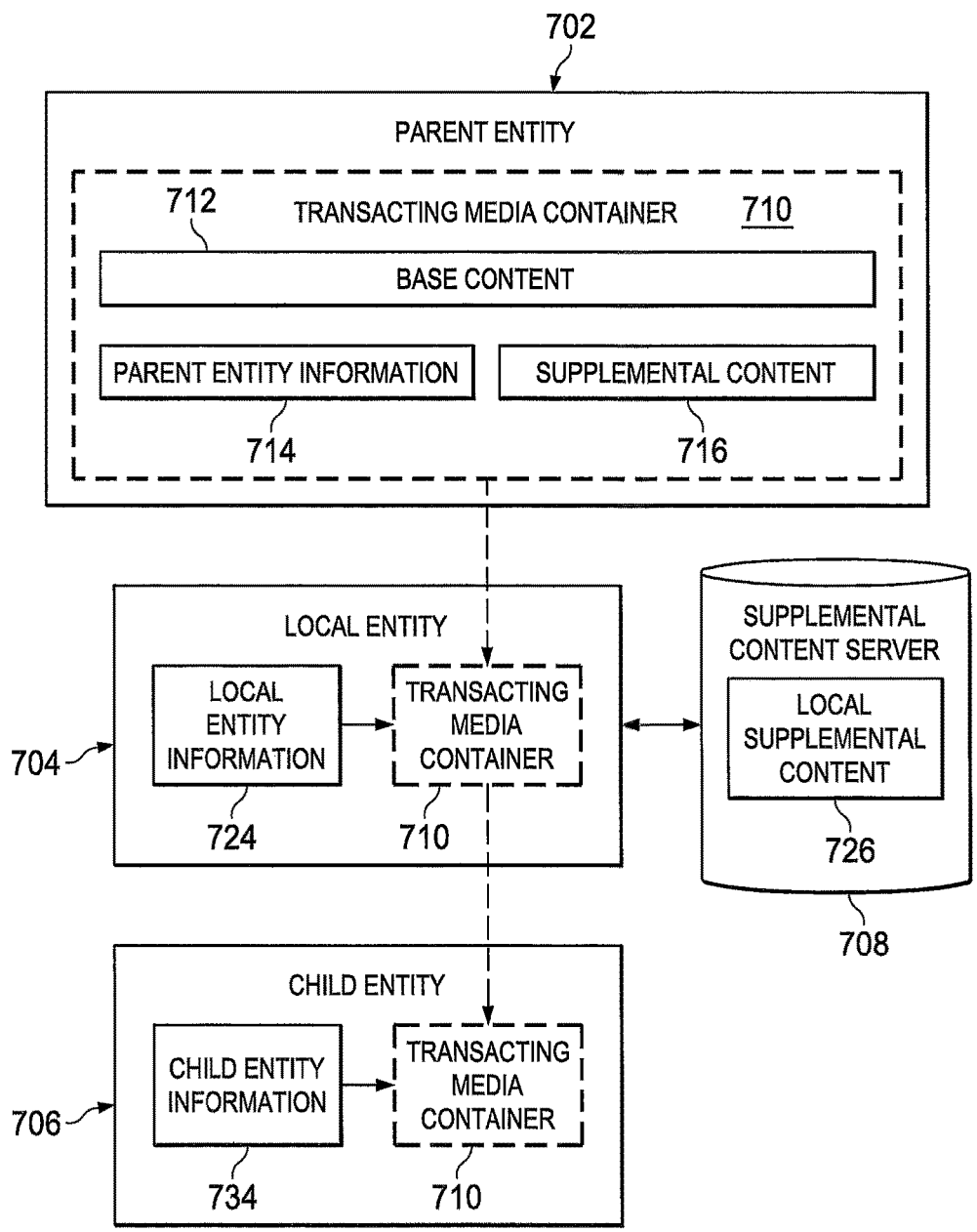
FIG. 7 illustrates an example parent-child series of relationships supporting n-level replication of supplemental content according to this disclosure.

FIG. 7 illustrates an example parent-child series of relationships supporting n-level replication of supplemental content according to this disclosure. The series shown here may utilize a replication arrangement, such as the arrangement shown in FIG. 5B and discussed above. The series here includes a parent entity 702, a local entity 704, a child entity 706, and a supplemental content server 708. In one example embodiment, the parent entity 702 may be associated with a company (such as ACME, Inc.), the local entity 704 may be associated with a region (such as Texas), and the child entity 706 may be associated with a city (such as Dallas). The structure of the levels of entities may be referred to as a hierarchy.

With reference to FIG. 7, a transacting media container 710 is provided along with base content 712, parent entity information 714, and supplemental content 716. The transacting media container 710 may be an example of SMART CONTAINER code. The parent entity 702 may represent an entity, company, or organization. In some embodiments, the parent entity 702 may reside on a server or other computer system. The parent entity 702 may also be configured to display the transacting media container 710 or send the transacting media container 710 to a user device for display.

In some embodiments, the base content 712 may be an example of the base content 200 as shown in FIGS. 2A through 2E. The parent entity information 714 can be one type of supplemental content. For example, the parent entity information 714 could correspond to an entity, company, or organization. The parent entity information 714 may also describe other characteristics, such as geographical region. For instance, the geographical region for the parent entity 702 may be an entire country.

The supplemental content 716 could be related or unrelated to the parent entity information 714. As an example, the supplemental content 716 could represent, for example, one or more products or services. The supplemental content 716 may relate to what is displayed in the base content 712 as well as the parent entity information 714.

In the local entity 704, the transacting media container 710 is provided along with local entity information 724. The local entity 704 may receive the transacting media container 710 from the parent entity 702. In some examples, only a portion of the code for the local software container 710 is sent from the parent entity 702. In other examples, all of the code for the transacting media container 710 is sent from the parent entity 702. In still other examples, code, base content 712, parent entity information 714, supplemental content 716, or a combination thereof is sent from the parent entity 702.

In some embodiments, the local entity 704 may also add local entity information 724 and/or local supplemental content 726 to the transacting media container 710. The local entity information 724 may be one type of supplemental content. For example, the local entity information 724 could correspond to an entity, company, or organization. The local entity information 724 may also describe other characteristics, such as geographical region. For instance, the geographical region for the local entity 704 may be a state. In other examples, the local entity information 724 may be an individual's information, such as name, identification, or other characteristic(s).

In some embodiments, the local entity 704 may retrieve the local supplemental content 726 from the supplemental content server 708. The local entity 704 may retrieve the local supplemental content 726 based on the local entity information 724, the base content 712, any information provided by the parent entity 702, and/or the like. As an example, the local supplemental content 726 could represent one or more products or services.

The local supplemental content 726 may be dynamically bound to the base content 712. In some embodiments, the local entity 704 may also be configured to display the transacting media container 710 or send the transacting media container 720 to a user device for display.

In the child entity 706, the transacting media container 710 is provided along with the child entity information 734. The child entity 706 may receive the transacting media container 710 from the local entity 704. In some examples, only a portion of the code for the local software container 710 is sent from the local entity 704. In other examples, all of the code for the local software container 710 is sent from the local entity 704. In still other examples, code, base content 712, parent entity information 714, supplemental content 716, or a combination thereof is sent from the local entity 704.

In some embodiments, the child entity 706 may also add child entity information 734 and/or child supplemental content to transacting media container 710. The child entity information 734 may be one type of supplemental content. For example, the child entity information 734 could correspond to an entity, company, or organization. The child entity information 734 may also describe other characteristics, such as geographical region. For instance, the geographical region for the child entity 706 may be a city. In other examples, the child entity information 734 may be an individual's information, such as name, identification, or other characteristics.

In some embodiments, an Application Programming Interface (API) set is provided for a Multi-Level-Marketing (MLM) or other network marketing industry. The API supports the replication of supplemental content across multiple levels, such as is shown in FIG. 7. The API could extend beyond standard create, update, or delete functions for account and store management. For the MLM industry, for example, the API could include options for cloning accounts and stores, providing real-time order notifications, supporting channel and account reporting, supporting payment processing, and providing the ability to integrate with MLM systems.

As an example, the API set could provide an MLM party with the ability to build account management that supports the ability to "onboard" accounts and associate an entity or owner account (such as a CINSAY INC. account) with the MLM system. As a particular example, the API may give control user access to the CINSAY SMART STORE MANAGER backend. This controls access to areas such as merchant accounts, payment systems, products, product pricing, videos, and sales data. Upon provisioning of a distributor's VIDEO SMART STORE from CINSAY, the distributor may not receive the login information to the backend, and control is handled by the MLM via the API set.

As another example, the API set could provide an MLM party with the ability to standardize MLM videos and product offerings within a VIDEO SMART STORE. This provides the ability to set up a default or seeded account for MLM accounts. This also provides the ability to replicate VIDEO SMART STORE templates via cloning, video, and product management. The API set further could give an MLM party the ability to receive real-time notifications of product orders or events.

In an example embodiment, a reporting set provides a daily and weekly export of sales by MLM account. The ability to cross-reference a CINSAY account identifier and the MLM system account provides an MLM party with the ability to integrate sales and events (such as transactions) with downline/MLM system reporting (such as by child entities).

This API set gives the ability to build a backend management platform within an MLM system. The platform may include building a common console for MLM accounts to manage VIDEO SMART STORES without giving the MLM accounts direct access to the VIDEO SMART STORE MANAGEMENT system. This allows direct linking of CINSAY accounts and MLM accounts for reporting and tracking.

Figure 8:
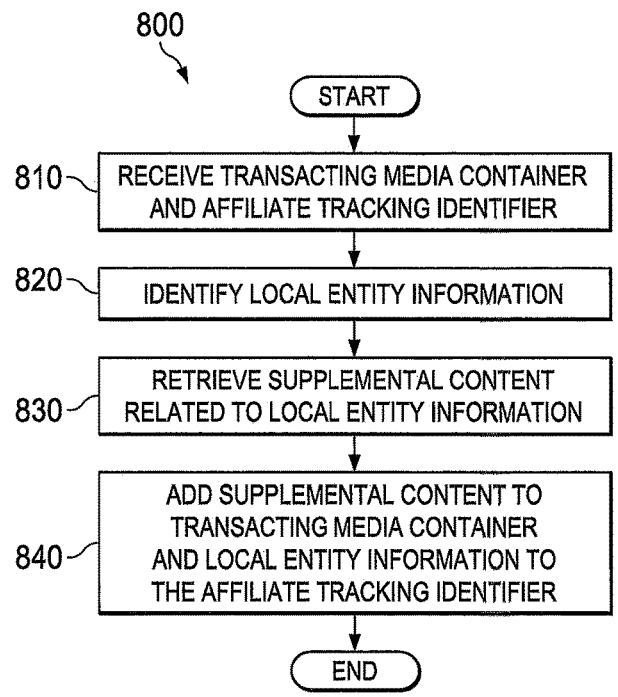
FIG. 8 illustrates an example process for managing a transacting media container to support n-level replication of supplemental content according to this disclosure.
Figure 9:
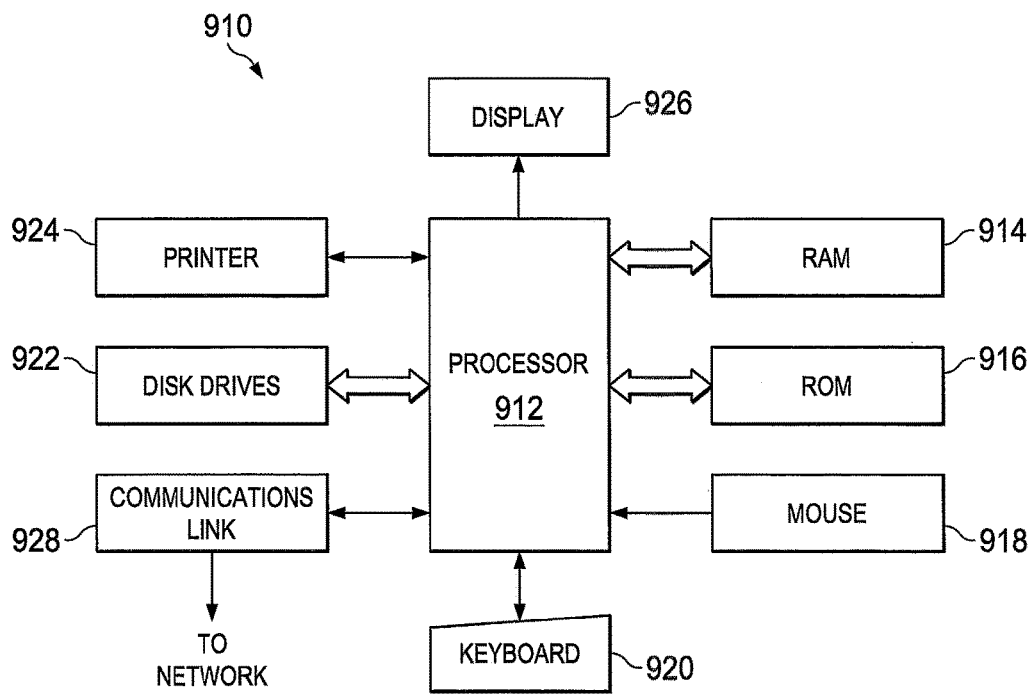
FIG. 9 illustrates an example computing device for n-level replication of supplemental content according to this disclosure.

FIG. 8 illustrates an example process 800 for managing a transacting media container to support n-level replication of supplemental content according to this disclosure. The process 800 may, for example, be performed by at least one processing device 912 as shown in FIG. 9 and described below. In the following description, the at least one processing device 912 is referred to as a controller, although the process 800 could be performed by any other suitable device.

At step 810, a controller receives a transacting media container an affiliate tracking identifier. The transacting media container can include video content and the affiliate tracking identifier can include first entity information from a first entity. The term "entity information," such as first entity information, second entity information, local entity information, child entity information, or parent information, may represent one or more identifying characteristics of an entity. The affiliate tracking identifier can allow tracking of commissions and reporting because the affiliate tracking identifier can include different entity information to see which entities at which levels are associated with a transaction.

At step 820, the controller identifies the local entity information. For example, if an entity is the BOY SCOUTS OF AMERICA (BSoA), the BSoA may be a parent entity, a troop may be a local entity, and an individual scout may be a child entity. The levels may be more numerous and vary differently. For instance, a state may be the local entity, the troop may be the child entity, and the scout may be a further child entity. The terms "parent," "local," and "child" are merely used to help describe the relationship between entities. Other terms, such as "first," "second," and "third," may also be used.

At step 830, the controller retrieves supplemental content related to the local entity information. As an example, a child entity may be assumed to carry the characteristics of the parent plus some modified characteristics. As a particular example, a state level entity may relate to supplemental content regarding a state such as cowboy hats for Texas. At the troop level, those hats may be branded with local sports teams or troop information.

At step 840, the controller adds the supplemental content and the local entity information to the transacting media container and the local entity information to the affiliate tracking identifier. In some embodiments, each entity adds its entity information to ensure tracking of the chain of entities for any transactions or events that may occur with respect to the supplemental content.

Thereafter, the controller may send the transacting media container to another entity or display the transacting media container on a device. At this point, the process 800 terminates for this controller, although the process 800 could repeat for the controller in another entity that receives the transacting media container.

FIG. 9 illustrates an example computing device 900 for n-level replication of supplemental content according to this disclosure. The computing device 900 here could be used to implement any of the techniques or functions described above, including any combination of the techniques or functions described above. The computing device 900 may generally be adapted to execute any of suitable operating system, including WINDOWS, MAC OS, UNIX, LINUX, OS2, IOS, ANDROID, or other operating systems.

As shown in FIG. 9, the computing device 900 includes at least one processing device 912, a random access memory (RAM) 914, a read only memory (ROM) 916, a mouse 918, a keyboard 920, and input/output devices such as a disc drive 922, a printer 924, a display 926, and a communication link 928. In other embodiments, the computing device 900 may include more, less, or other components. Computing devices come in a wide variety of configurations, and FIG. 9 does not limit the scope of this disclosure to any particular computing device or type of computing device.

Program code may be stored in the RAM 914, the ROM 916 or the disc drive 922 and may be executed by the at least one processing device 912 in order to carry out the functions described above. The at least one processing device 912 can be any type(s) of processing device(s), such as one or more processors, microprocessors, controllers, microcontrollers, multi-core processors, and the like. The communication link 928 may be connected to a computer network or a variety of other communicative platforms, including any of the various types of communication networks 140 described above. The disc drive 922 may include a variety of types of storage media such as, for example, floppy drives, hard drives, CD drives, DVD drives, magnetic tape drives, or other suitable storage media. One or multiple disc drive 922 may be used in the computing device 900.

Note that while FIG. 9 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 900 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to n-level replication of supplemental content, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. In addition, examples of graphical presentations are for illustration only, and content can be presented in any other suitable manner. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A method, comprising:
   receiving, by at least one processor through at least one communication link, a transacting media container including video content, an affiliate tracking identifier with first entity information associated with a first entity, and processor-executable instantiation code;
   identifying, by the at least one processor, second entity information associated with a second entity;
   retrieving, by the at least one processor through the at least one communication link, supplemental content based on the second entity information, the supplemental content including a plurality of interactive advertisements related to one or more products or services present in the video content;
   adding, by the at least one processor, (1) the supplemental content to the transacting media container to define an updated transacting media container, and (2) the second entity information to the affiliate tracking identifier to define an updated affiliate tracking identifier included in the updated transacting media container; and transmitting, by the at least one processor through at least one communication link, the updated transacting media container including the updated affiliate tracking identifier to a first endpoint compute device for presentation of the video content and at least one advertisement of the plurality of interactive advertisements of the supplemental content to a user of the first endpoint compute device based on execution of the processor-executable instantiation code by the first endpoint compute device, the updated transacting media container configured such that, when instantiated: (a) an interface is displayed, the interface configured to (i) allow the user to share the updated transacting media container to a second endpoint compute device, and (ii) allow the user to interact with the presented at least one interactive advertisement and initiate a transaction without leaving display areas of the video content and supplemental content; (b) user interactions with the interface are monitored; and (c) the updated affiliate tracking identifier is further updated at the first endpoint compute device based on the monitored user interactions to define a further updated affiliate tracking identifier.

2. The method of claim 1, wherein the updated transacting media container is further configured to:
monitor transaction information related to the at least one interactive advertisement of the supplemental content; and
transmit the transaction information and the further updated affiliate tracking identifier to one parent entity of a plurality of parent entities, the first entity being one parent entity from the plurality of parent entities.

3. The method of claim 1, wherein the first entity information and the second entity information comprise at least one of: company information, organization information, and individual information.

4. The method of claim 1, wherein at least one of the affiliate tracking identifier and updated affiliate tracking identifier comprises entity information for multiple parent entities that previously processed the transacting media container.

5. The method of claim 1, further comprising:
receiving transaction information related to the supplemental content from the first endpoint compute device; and
sending the transaction information and the updated affiliate tracking identifier to one parent entity from a plurality of parent entities.

6. The method of claim 5, wherein the transaction information is related to one or more products or services associated with the supplemental content.

7. An apparatus, comprising:
at least one memory configured to store a transacting media container, the transacting media container including video content and an affiliate tracking identifier with first entity information; and
at least one processing device operatively connected to the at least one memory, the at least one processing device configured to:
receive the transacting media container from a first entity;
identify second entity information associated with a second entity;
identify third entity information associated with a third entity;
retrieve supplemental content based on the second entity information and the third entity information, the supplemental content including a plurality of interactive advertisements related to one or more products or services represented in the video content;
add (1) the supplemental content to the transacting media container to define an updated transacting media container, and (2) the second entity information and the third entity information to the affiliate tracking identifier to define an updated affiliate tracking identifier included in the updated transacting media container; and
initiate transmission of the updated transacting media container and the updated affiliate tracking identifier to a first endpoint compute device for presentation of the video content and at least one interactive advertisement of the plurality of interactive advertisements of the supplemental content to a user of the first endpoint compute device when the updated transacting media container is executed on the first endpoint compute device, the updated transacting media container configured to, when executed on the first endpoint compute device: (a) display a share interface, the share interface configured to allow the user to propagate the updated transacting media container over a network to a second endpoint compute device; (b) display a transaction interface, the transaction interface configured to allow the user to initiate a transaction without leaving display areas of the video content and supplemental content (c) monitor user interactions with the share interface and transaction interface; and (d) further update the updated affiliate tracking identifier based on monitored user interactions with the share interface and transaction interface to define a further updated affiliate tracking identifier.

8. The apparatus of claim 7, wherein the updated transacting media container includes the updated affiliate tracking identifier or the further updated affiliate tracking identifier, and is configured to when propagated over the network to the second endpoint compute device and executed on the second endpoint compute device: (e) display a share interface instance at the second endpoint compute device, the share interface instance configured to allow a user of the second endpoint compute device to propagate the updated transacting media container to a third endpoint compute device; (f) display a transaction interface instance at the second endpoint compute device, the transaction interface instance configured such that the user of the second endpoint compute device can initiate a transaction without leaving a video content display area or a supplemental content display area; (g) monitor interactions with the share interface and the transaction interface at the second endpoint compute device; and (h) modify the updated affiliate tracking identifier or the further updated affiliate tracking identifier at the second endpoint compute device based on monitored interactions with the share interface and transaction interface at the second endpoint compute device.

9. The apparatus of claim 8, wherein the at least one processing device is further configured to:
receive transaction information related to the supplemental content from the first end point compute device; and
initiate transmission of the transaction information and the updated affiliate tracking identifier to one parent entity of a plurality of parent entities.

10. The apparatus of claim 9, wherein the transaction information is related to one or more products or services associated with the supplemental content.

11. The apparatus of claim 7, wherein the at least one processing device is further configured to:

receive transaction information related to the at least one interactive advertisement of the supplemental content; and initiate transmission of the transaction information and the updated affiliate tracking identifier to one of a plurality of parent entities, the first entity including one parent entity of the plurality of parent entities.

12. The apparatus of claim 7, wherein the first entity information, second entity information, and third entity information comprise at least one of: company information, organization information, and individual information.

13. The apparatus of claim 7, wherein the affiliate tracking identifier comprises entity information for multiple parent entities that previously processed the transacting media container.

14. A non-transitory computer-readable storage medium comprising logic stored on the computer-readable storage medium, the logic configured when executed to cause at least one processing device to:

receive a transacting media container including video content and an affiliate tracking identifier with first entity information associated with a first entity;

identify second entity information associated with a second entity;

retrieve supplemental content based on the second entity information, the supplemental content including at least one interactive advertisement related to one or more products or services represented in the video content;

identify third entity information associated with a third entity;

retrieve supplemental content based on the third entity information, the supplemental content including at least one further interactive advertisement related to the one or more products or services represented in the video content;

add (1) the supplemental content based on the second entity information and including the at least one interactive advertisement, and the supplemental content based on the third entity information and including the at least one further interactive advertisement to the transacting media container to define an updated transacting media container, and (2) the second entity information and the third entity information to the affiliate tracking identifier to define an updated affiliate tracking identifier included in the updated transacting media container; and initiate transmission of the updated transacting media container including the updated affiliate tracking identifier to a first endpoint compute device for presentation of the video content, the at least one interactive advertisement, and the at least one further interactive advertisement to a user, the updated transacting media container configured to: (a) display an interface configured to (i) allow the user to share the updated transacting media container to a second endpoint compute device, and (ii) allow the user to interact with a presented interactive advertisement and initiate a transaction therewith without navigating away from a display area of the video content; (b) monitor user interactions with the interface; and (c) further update the updated affiliate tracking identifier based on the user interactions.

15. The non-transitory computer-readable storage medium of claim 14, wherein the logic is further configured when executed to cause the at least one processing device to:

receive transaction information related to the supplemental content from the first endpoint compute device; and initiate transmission of the transaction information and the affiliate tracking identifier to one parent entity of a plurality of parent entities, the first entity being one parent entity of the plurality of parent entities.

16. The non-transitory computer-readable storage medium of claim 14, wherein the first entity information and the second entity information comprise at least one of: company information, organization information, and individual information.

17. The non-transitory computer-readable storage medium of claim 14, wherein the updated affiliate tracking identifier comprises entity information for multiple parent entities that previously processed the transacting media container.

18. The non-transitory computer-readable storage medium of claim 14, wherein the logic is further configured when executed to cause the at least one processing device to:

receive transaction information related to at least one of the at least one interactive advertisement and the at least one further interactive advertisement from the first endpoint compute device; and initiate transmission of the transaction information and the updated affiliate tracking identifier to one parent entity of a plurality of parent entities.

* * * * *